United States Patent [19]

Samuelson et al.

[11] Patent Number: 5,278,414

[45] Date of Patent: Jan. 11, 1994

[54] OPTICAL MOTION AND ANGULAR POSITION SENSING METHOD AND SENSOR

[75] Inventors: Stephan Samuelson, Austin; Mark Crandall, San Marcos, both of Tex.

[73] Assignee: Detex Corporation, New Braunfels, Tex.

[21] Appl. No.: 818,754

[22] Filed: Jan. 9, 1992

[51] Int. Cl.⁵ .............................................. G01D 5/34
[52] U.S. Cl. ................................ 250/349; 250/206.1
[58] Field of Search ..................... 350/349, 350, 221; 340/573, 574; 250/206.1, 206.2

[56] References Cited

U.S. PATENT DOCUMENTS

| | | |
|---|---|---|
| 3,950,739 | 4/1976 | Campman . |
| 4,450,353 | 5/1984 | Sjolund . |
| 4,914,422 | 4/1990 | Rosenfield et al. . |
| 4,959,637 | 9/1990 | Woods et al. ............... 340/573 |
| 4,978,946 | 12/1990 | Nordholm et al. . |

FOREIGN PATENT DOCUMENTS 2848747 11/1978 Fed. Rep. of Germany .

OTHER PUBLICATIONS

Brochure, Rampart Personal Protection Devices for SurPass 88 Pass 88 ThermAlarm, distributed by Rampart Corporation, publication date unknown.
Brochure, LifeGard IV Personal Alert Safety System, Model R-400, distributed by The Antenna Specialists Co., 1990.
Brochure, When Your Life's On The Line, You Need An Ally, distributed by Racal Panorama, 1990.
Brochure, Super Pass, distributed by Grace Industries, Inc., publication date unknown.

*Primary Examiner*—Paul M. Dzierzynski
*Assistant Examiner*—Richard Hanig
*Attorney, Agent, or Firm*—Arnold, White & Durkee

[57] ABSTRACT

An optical motion and angle sensor comprising a chamber, a light source for emitting light into a first half of the chamber along an axis of the chamber, and a plurality of light detectors for receiving light exiting from a second half of the chamber, at an angle relative to the axis of the chamber. When applied as a motion sensor, the sensor facilitates discrimination between various types of motion, and specifically allows the discrimination of slight normal motion from motion associated with incapacity of a person wearing the sensor. In addition, the sensor can provide this discrimination regardless of orientation. When applied as an angle sensor, the sensor facilitates the detection of the angle of inclination of the sensor relative to an axis, as well as the direction of the inclination.

17 Claims, 7 Drawing Sheets

OPTICAL MOTION AND ANGULAR POSITION SENSING METHOD AND SENSOR

BACKGROUND OF THE INVENTION

The present invention relates to optical sensors applicable as a motion sensor to distinguish between different types of motion, without regard to orientation of the sensor, and applicable as an angular position sensor to determine angular position in two degrees of freedom.

Motion sensors are used in Personal Alert Safety Systems (PASS) which are worn by personnel that work in isolated and dangerous environments such as, for example, firemen, industrial workers, chemical workers or security guards. Such PASS devices monitor, among other things, the movement of the person, and provide an alarm or other indication when sensed movement is determined to be abnormal, indicating incapacity of the person. Prior PASS devices incorporate various types of motion detectors for this purpose.

A first type of motion detector is found in U.S. Pat. No. 4,978,946, issued Dec. 18, 1990, and comprises an electrically conductive enclosure including a conductive circuit and containing a conductive ball. Motion is detected when the ball makes contact to both the conductive enclosure and the conductive circuit.

Another type of detector is presented in German Offenlegungsschrift 28 48 747, published May 5, 1980, which includes a rotatable member having a peripheral surface with differing reflective characteristics. Light, reflected from the periphery of the rotatable member, is detected to evaluate motion.

U.S. Pat. No. 4,450,353, issued May 22, 1984, presents an optical tilt detector which includes a chamber containing a ball in damping liquid, a bottom surface of the chamber being pyramidal. Tilting of the device is detected when the ball is displaced from an axis of the device, allowing light to strike a light detector located on the axis. The direction of tilt relative to the axis cannot be detected.

A problem with prior PASS devices has been the incidence of false alarms when a wearer is moving only slightly. Such slight movements are often erroneously detected as worker incapacity, and a false alarm is sounded. The occurrence of such false alarms may actually encourage a worker to deactivate the PASS device, a potentially dangerous situation. Another problem has been sensor orientation sensitivity. Often, a sensor will lose its ability to detect motion when inverted, or when located at an angle.

In addition, other applications, such as in the toy, automobile or aerospace industries, or other industrial applications such as robotic assembly, may have need for a motion sensor which is capable of distinguishing between various types of motion, despite the orientation of the sensor.

SUMMARY OF THE INVENTION

The optical sensor of the present invention in large part eliminates the above-noted discrepancies in prior motion sensors by providing an optical sensor which is capable of distinguishing between different types of motion, without regard to the orientation of the sensor. Further, the optical sensor of the present invention can provide angular position information.

The invention comprises a chamber, such as a substantially spherical chamber, containing a substantially opaque ball. Light enters an upper half of the chamber along an axis, and a plurality of light detectors are positioned so as to receive light exiting from lower half of the chamber at an angle relative to the axis. A method of detecting an extent of motion of the chamber is also presented.

More specifically, the present invention includes a chamber containing a substantially opaque ball, the chamber and ball being adapted to permit motion of the ball within the chamber substantially independent of an orientation of an axis of the chamber, a light source for emitting light into a first half of the chamber along the axis of the chamber, and a plurality of light detectors for detecting light exiting the second half of the chamber at respective angles relative to the axis of the chamber. The light detectors are preferably four in number, and are preferably sensitive to infrared light produced by the light source. The angle at which the detectors are placed relative to the axis is preferably substantially the same for each detector, and can be within the range of 0° to 90° relative to the axis, with 45° being preferred.

The chamber and ball are both preferably substantially spherical, but can be of any shape as long as the motion of the ball within the chamber is substantially independent of the orientation of the axis of the chamber. When the ball and chamber are both substantially spherical, the ratio of the diameter of the chamber to the diameter of the ball is preferably within the range of 2:1 to 5:1.

In a preferred embodiment, the chamber is formed of first and second housings, which have formed therein first and second halves of the chamber. The housing halves are assembled so that the first and second chamber halves abut to form the chamber, with the ball being contained in the chamber.

DESCRIPTION OF THE PREFERRED EMBODIMENT

Figure 1:
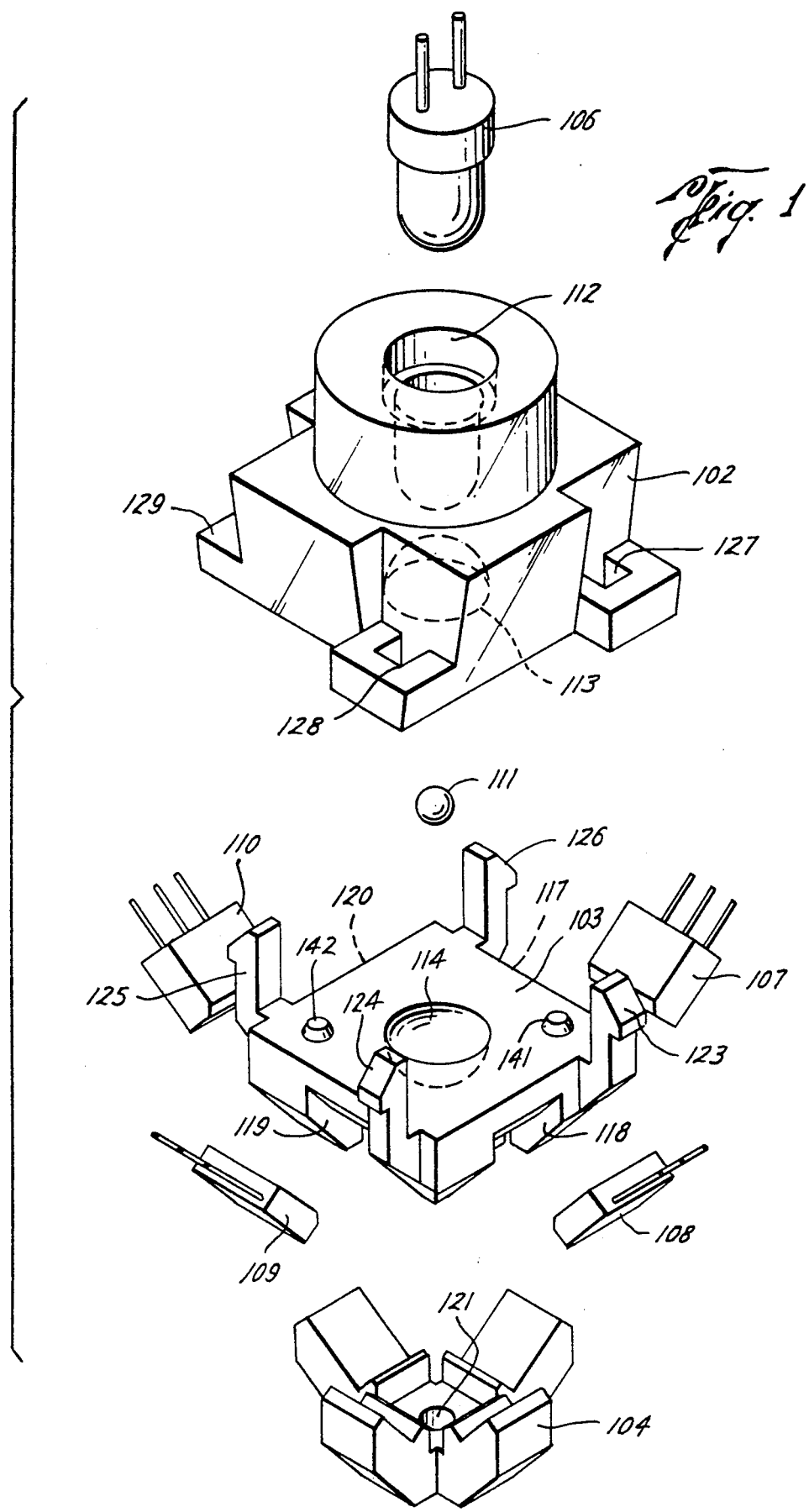
FIG. 1 is an exploded isometric view of an embodiment of the optical sensor of the present invention.
Figure 2:
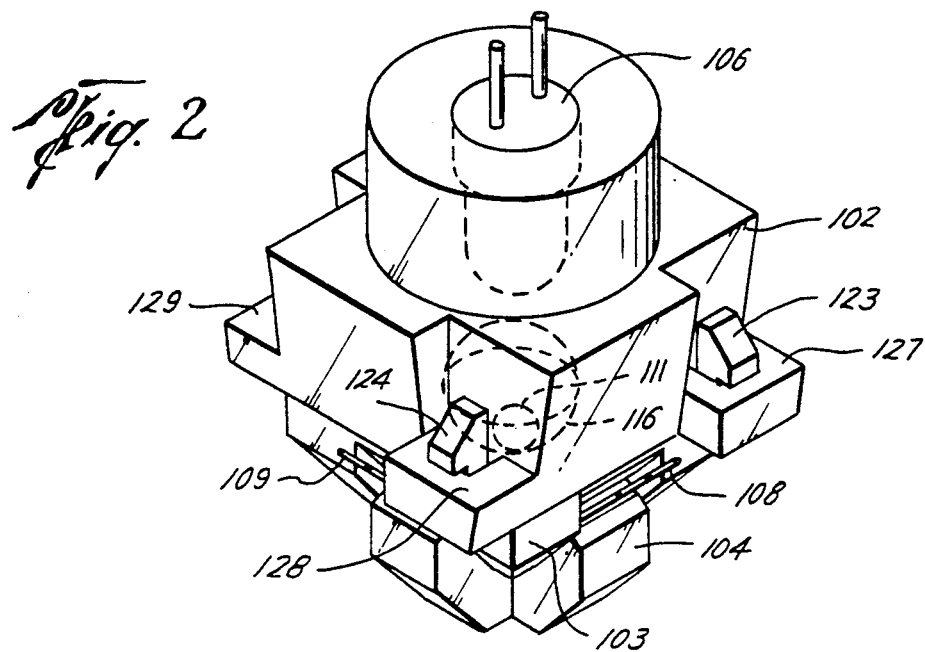
FIG. 2 is an isometric view of the assembled sensor of FIG. 1.
Figure 3:
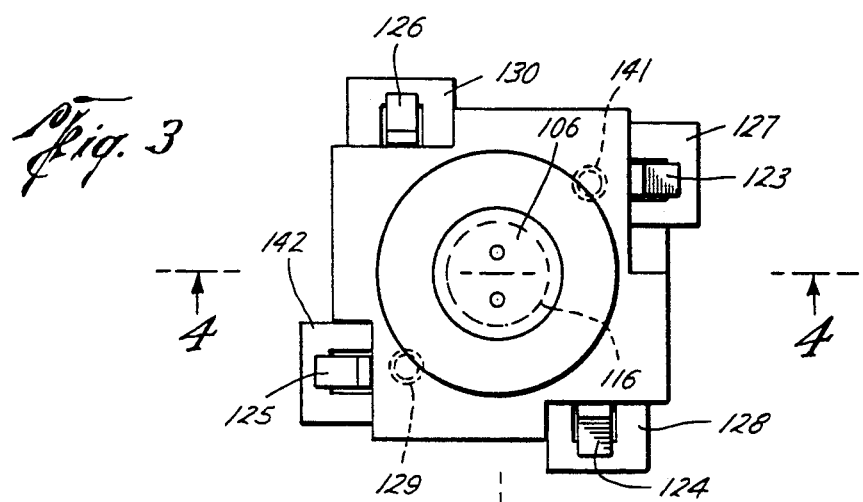
FIG. 3 is a top view of the sensor of FIG. 2.

Referring to FIGS. 1-4, presented in FIG. 1 is an exploded, isometric view of an embodiment of optical sensor 101 of the present invention. Sensor 101 includes first housing 102, second housing 103, and sensor cover 104. Other components of sensor 101 include light source 106, light detectors 107-110, and substantially opaque ball 111.

First housing 102, second housing 103, and sensor cover 104 are preferably made of plastic or similar material. In the preferred embodiment, first housing 102, second housing 103, and sensor cover 104 are made of clear Lexan 121 material, available from the General Electric Company, and are preferably injection molded. However, other methods of manufacture such as milling are also acceptable.

For simplicity of manufacture, first housing 102 and second housing 103 are preferably substantially transparent to light emitted by light source 106. However, it will be understood from the further description of this embodiment that only selected portions of first housing 102 and second housing 103 need actually be substantially transparent, and that other portions of first housing 102 and second housing 103 can be of any opacity.

In the preferred embodiment, sensor cover 104 is made of the same transparent material as first housing 102 and second housing 103, in order to simplify the manufacturing process. However, sensor cover 104 can be of any suitable material, and of any opacity.

Light source 106 is preferably an infrared light emitting diode (LED) such as, for example, a type MLED81 LED, available from Motorola, or the functional equivalent. Light sources emitting light of any frequency or spectrum of frequencies would also be acceptable. Recess 112 formed in first housing 102, accommodates light source 106 by press fit. However, other methods of mounting light source 106 in first housing 102 are also acceptable.

First housing 102 has formed therein a first half portion 113, and second housing 103 has formed therein a second half portion 114. First and second half portions 113 and 114 can each be substantially hemispherical. When first housing 102 and second housing 103 are assembled, ball 111 is captured within, and is free to move about, chamber 116 formed from first half portion 113 and second half portion 114. Although chamber 116 is preferably substantially spherical, other shapes for chamber 116 would also be acceptable as long as the movement of ball 111 about chamber 116 is substantially independent of the orientation of axis 131 of chamber 116 (see also, FIG. 4).

Ball 111 is preferably made of metal, but can be of any substantially opaque material, as long as ball 111 can move freely without sticking to the interior of chamber 116. It is also contemplated that ball 111 is a quantity of mercury. Ball 111 can be of any shape, including substantially spherical, as long as the movement of ball 111 about chamber 116 is substantially independent of the orientation of axis 131 of chamber 116.

Light detectors 107-110 are preferably type MRD750 integrated circuits, available from Motorola. However, it will be understood that equivalent types of light detectors would also be acceptable as long as light detectors 107-110 are sensitive to the frequency of light produced by light source 106. These preferred light detectors include a comparator circuit and provide a digital (1 or 0) output signal which has proven useful when sensor 101 is used as a motion sensor. When sensor 101 is used as an angular position sensor, light detectors 107-110 preferably provide an analog output, such as that provided by a phototransistor.

In the preferred embodiment, recesses 117-120 are formed in second housing 103 to fit the outer dimension of light detectors 107-110. During assembly, hole 121 in sensor cover 104 is press fitted onto post 122 formed on second housing 103 so that sensor cover 104 holds light detectors 107-110 within recesses 117-120 of second housing 103. Other methods of connecting sensor cover 104 to second housing 103 are also acceptable. Further, other methods of affixing light detectors 107-110 to second housing 103 would also be acceptable.

During assembly of motion sensor 101, flexible tangs 123-126 integrally formed with second housing 103 are snapped into retainers 127-130 formed in first housing 102. In addition, protrusions 141 and 142, integrally formed with second housing 103, mate with complementary detents (not shown) formed in first housing 102 when sensor 101 is assembled, thereby promoting axial alignment between half portions 113 and 114 and lending torsional stability to sensor 101.

Figure 4:
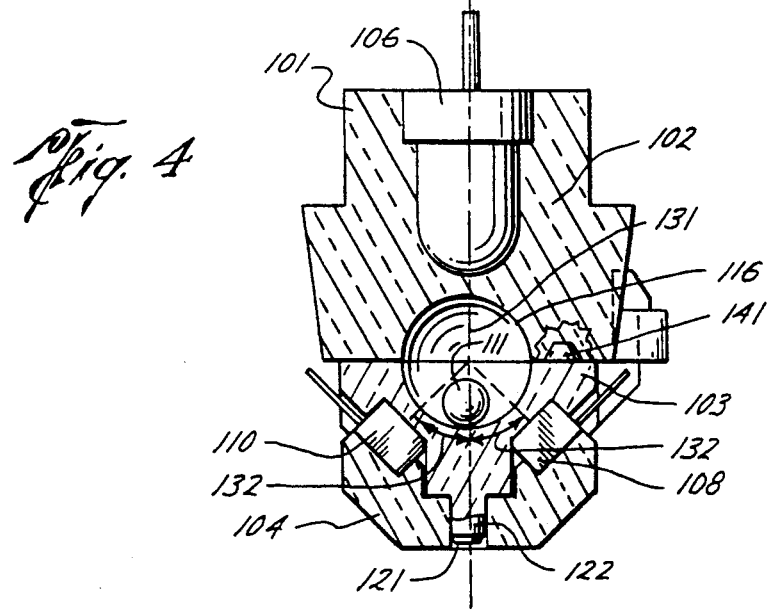
FIG. 4 is a cross-section through section 4—4 of the sensor of FIG. 3.

Referring to FIG. 4, after assembly of sensor 101, ball 111 is allowed to move freely within chamber 116. Light source 106 emits light into a first half of chamber 116, along axis 131 of chamber 116. Light detectors 107-110 are positioned to receive light exiting from a second half of chamber 116 at an angle 132 relative to axis 131.

As ball 111 moves within chamber 116 as a result of movement of sensor 101, ball 111 will occasionally obscure light detectors 107-110 thereby preventing light emitted by light source 106 from striking light detectors 107-110.

In a preferred embodiment, when sensor 101 is used as a motion sensor, chamber 116 is substantially spherical and is approximately 0.25 inches (6.4 mm) in diameter, and ball 111 is also substantially spherical and is approximately 0.095 inches (2.4 mm) in diameter, providing a ratio of the diameter of chamber 116 to the diameter of ball 111 of 2.6:1. However, it is believed that the ratio of the diameter of chamber 116 to the diameter of ball 111 within the range of 2:1 to 5:1 would be acceptable without departing from the scope of the present invention.

Angle 132 at which light exiting from the lower hemisphere of chamber 116 is detected is preferably 45°, however, angles within the range of greater than 0° to less than 90° would also be acceptable. It should also be noted that light detectors 107-110 need not all be located at the same angle relative to axis 131. In other words, light detectors 107-110 could each be located at different angles relative to axis 131.

It should also be noted that while in the preferred embodiment light source 106 and light detectors 107-110 are mounted immediately adjacent chamber 116, other configurations are also possible, as long as light enters a first half of chamber 116 along axis 131, and is detected as it exits a second half of chamber 116 at angle 132 to axis 131. Thus, light source 106 and light detectors 107-110 could be located remote from chamber 116, and source 106 and detectors 107-110 could be coupled to chamber 116 by fiber optic cable, or equivalent light guiding means. Further, although as mentioned above, the components of sensor 101 are preferably made from the same substantially transparent material, only those portions of chamber 116 which overlie light source 106 and the photosensitive portions of light detectors 107-110 need actually be substantially transparent, and all other portions of sensor 101 can be of any opacity.

In addition, although the preferred embodiment uses four light detectors 107-110, it has been found that at least two light detectors could be used, without departing from the spirit and scope of the present invention.

Figure 5:
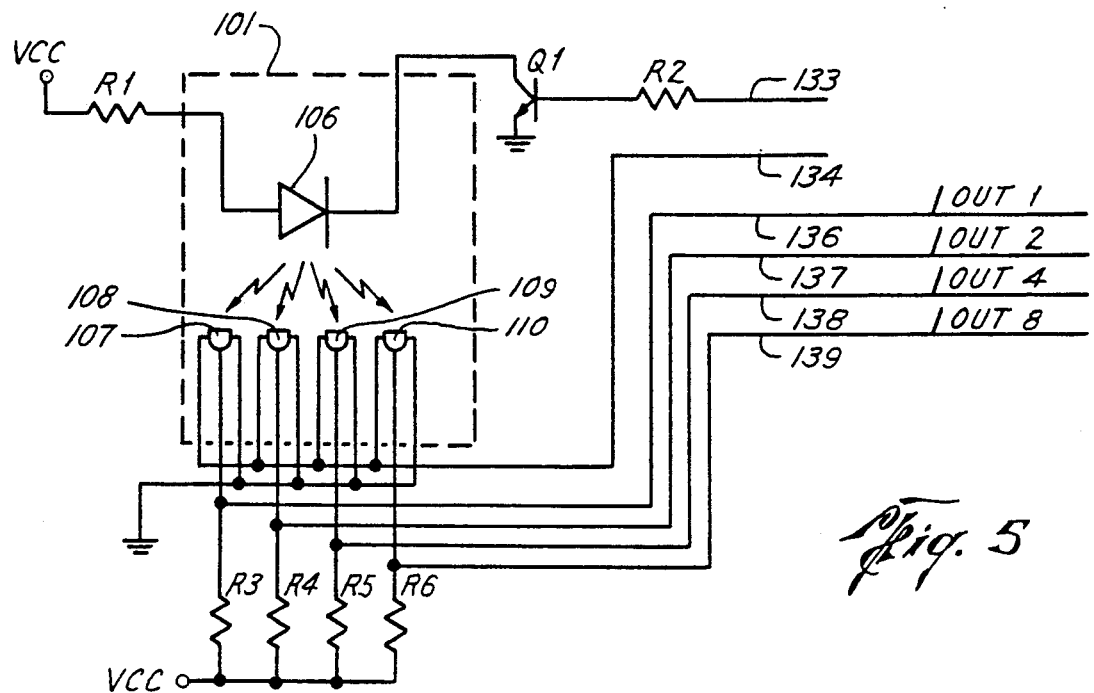
FIG. 5 is an electrical schematic of an embodiment of the sensor of the present invention.

Referring now to FIG. 5, disclosed is an electrical schematic of a circuit used to illustrate the motion sensing capabilities of the sensor of the present invention.

The anode of light source 106 is connected to voltage VCC through resister R1. VCC is preferably 5 Volts for the specified electrical components, but can be greater or less depending upon the power requirements of the electrical components used. The cathode of light source 106 is connected to the collector of transistor Q1, and the emitter of transistor Q1 is connected to ground. The base of transistor Q1 is connected though resistor R2 to light source control line 133.

Each of light detectors 107-110, which, as mentioned above, are preferably type MRD750 available from Motorola, are configured identically. The power pin of each of light detectors 107-110 is connected to light detector control line 134, and the ground pin of each of light detectors 107-110 is connected to ground. The output pins of light detectors 107-110 are respectively connected to output lines 136-139, and are connected through respective resistors R3-R6 to VCC.

In operation, light source 106 is turned on and off by application of a light source control signal to light source control line 133. Similarly, light detectors 107-110 are activated by application of a light detector control signal to light detector control line 134. When light source 106 is on and light detectors 107-110 are active, the signals appearing on light detector output lines 136-139 are indicative of the sporadic motion of ball 111 within chamber 116 (see also FIG. 4). More specifically, when ball 111 blocks light from impinging upon any one of light detectors 107-110, the appropriate light detector output line 136-139 will so indicate.

Transistor Q1 and light detector control line 134 are provided to permit reduction in power drain from VCC, which is typically derived from a battery. If power drain is not a concern, transistor Q1 could be eliminated, the cathode of LED 106 could be grounded, and light detector control line 134 could be connected directly to VCC. In this configuration, LED 106 would be on and detectors 107-110 would be active whenever VCC was applied.

The graphs of FIGS. 6-13 further illustrate the motion detecting capabilities of the present invention, particularly the capability of the present invention to discern slight motion associated with normal activity with motion associated with incapacity, regardless of sensor orientation.

To generate the graphs of FIGS. 6-13, light detector output lines 136-139 of FIG. 5 were arbitrarily assigned weights of 1, 2, 4 and 8. Light detector output lines 136-139 were then sampled approximately every 625 microseconds, and the occurrences for weights 1, 2, 4 and 8 were recorded and accumulated as hexadecimal bytes. Every 125 ms, the accumulated weight counts were read, and the hexadecimal byte with the most counts for that 125 ms time period was assigned as the primary weight for that time period. Thus, for example, if for a given 625 microsecond sample, light detector output lines 137 and 138 were active, this would indicate an occurrence of weight 6 (Hex 0110), and the count for weight 6 would be incremented by 1. If at the end of a given 125 ms time period, weight 15 (Hex 1111) had accumulated the most counts, the entire time period was assigned the primary weight of 15.

This procedure was used to plot the output of detector 101 for four different types of motion including running, walking, sitting down, and lying down, with detector 101 being attached to the belt of a wearer and being positioned in both the upright position (illustrated in FIGS. 2 and 4), and in the inverted position. Running and walking are intended to simulate normal activity, while sitting and lying down are intended to simulate incapacity.

Figure 6:
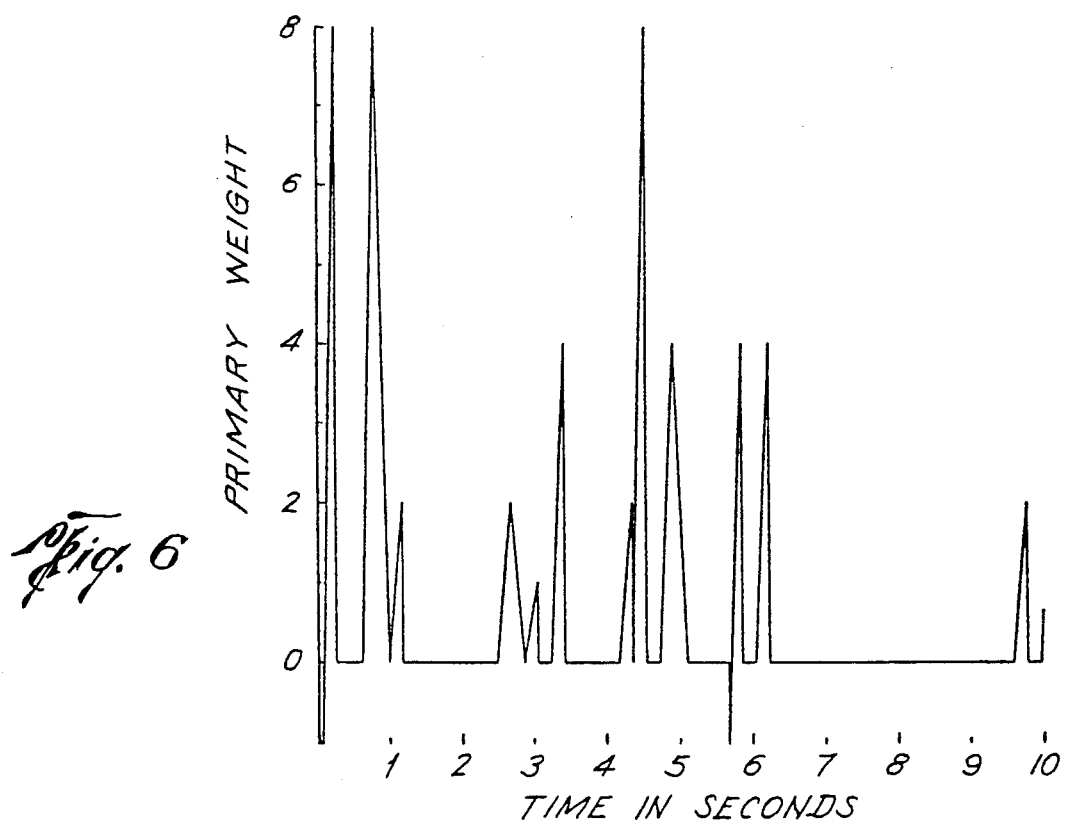
FIGS. 6-13 are graphs illustrating the motion discrimination capabilities of the present invention when applied as a motion sensor.
Figure 7:
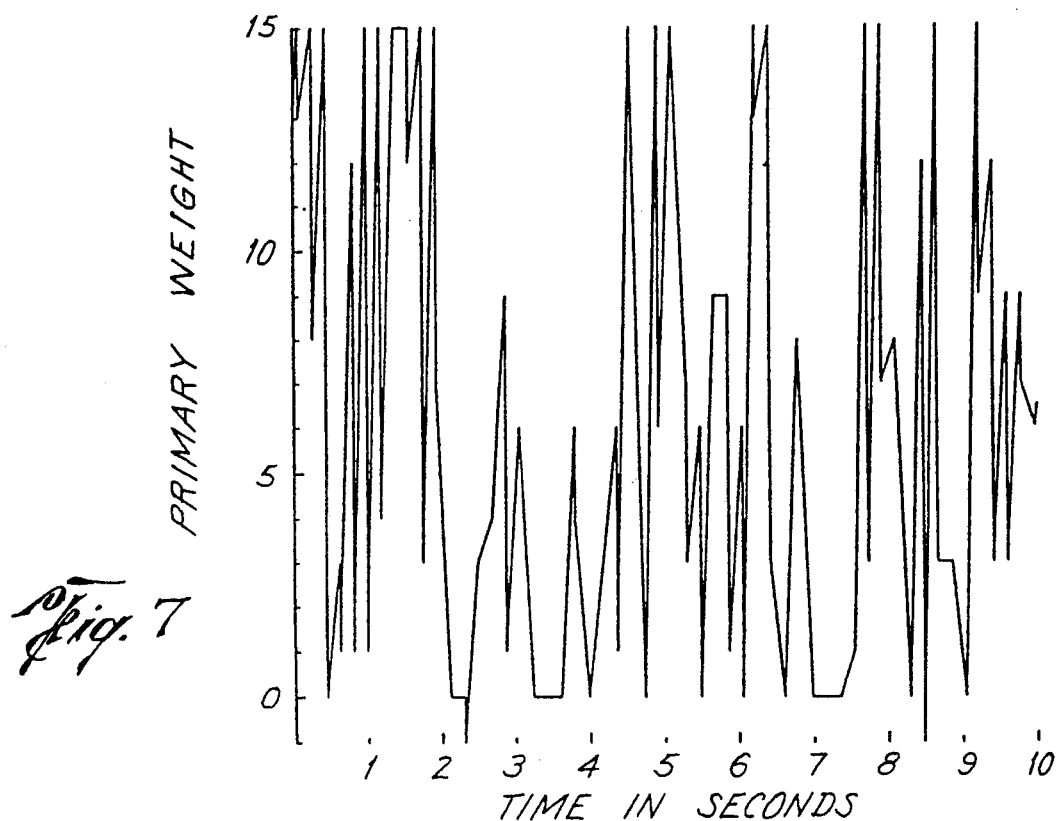

FIG. 6 presents the primary weights produced by detector 101 for several seconds of running, with detector 101 in the upright position, and FIG. 7 illustrates the primary weights produced by detector 101 for several seconds of running, with detector 101 in the inverted position.

Figure 8:
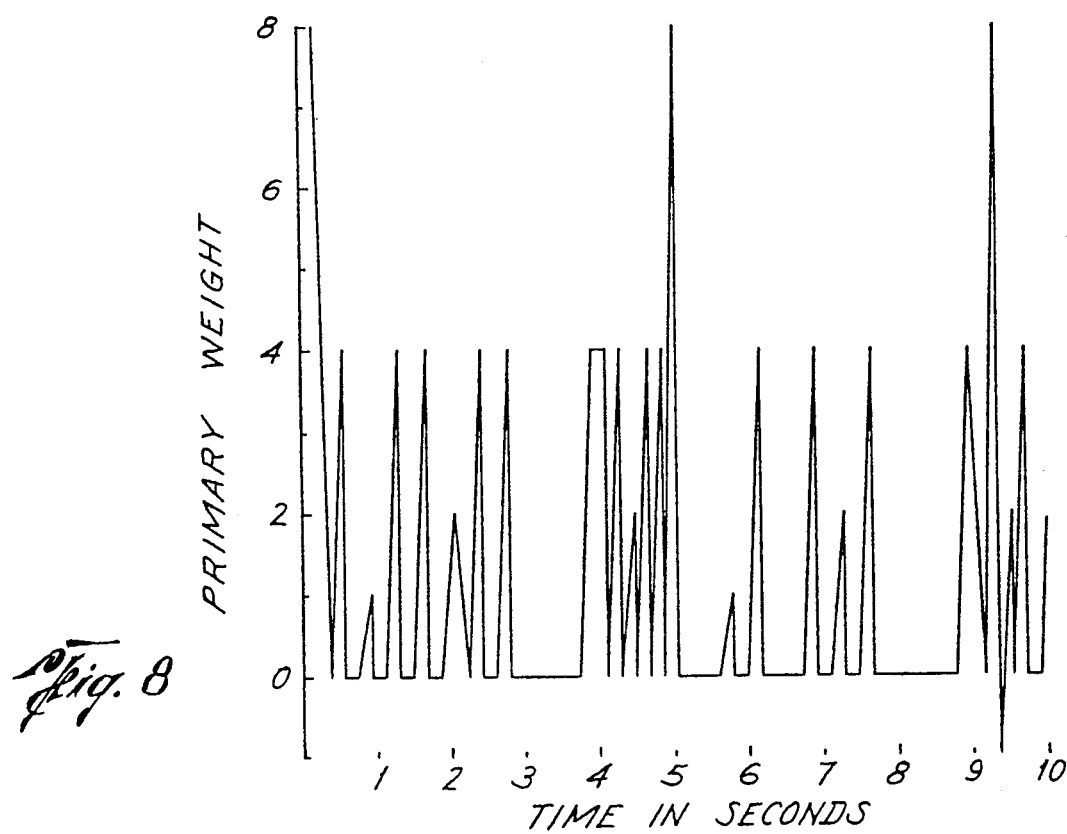
Figure 9:
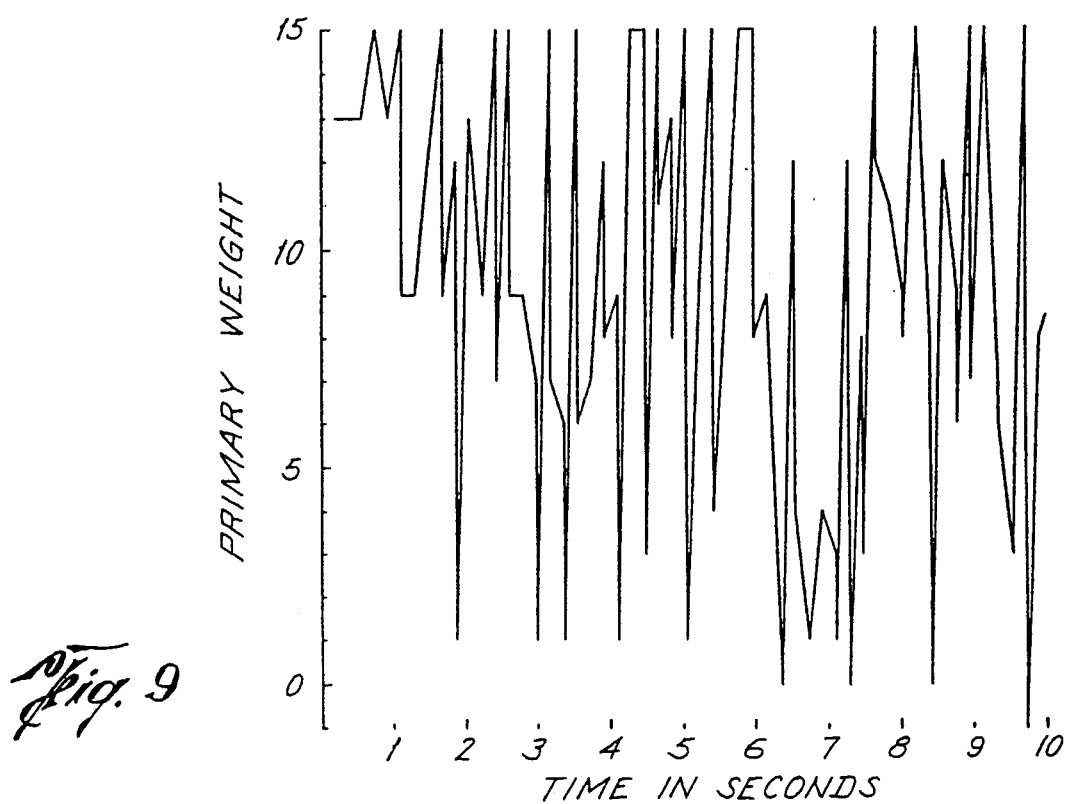

Similarly, FIG. 8 presents the primary weights produced by detector 101 in the upright position for several seconds of walking, whereas FIG. 9 presents the primary weights produced by detector 101 in the inverted position for several seconds of walking.

As can be seen with reference to FIGS. 6, 7, 8 and 9, the normal activity of running and walking results in the occurrence of several different primary weights during the recording time period.

Figure 10:
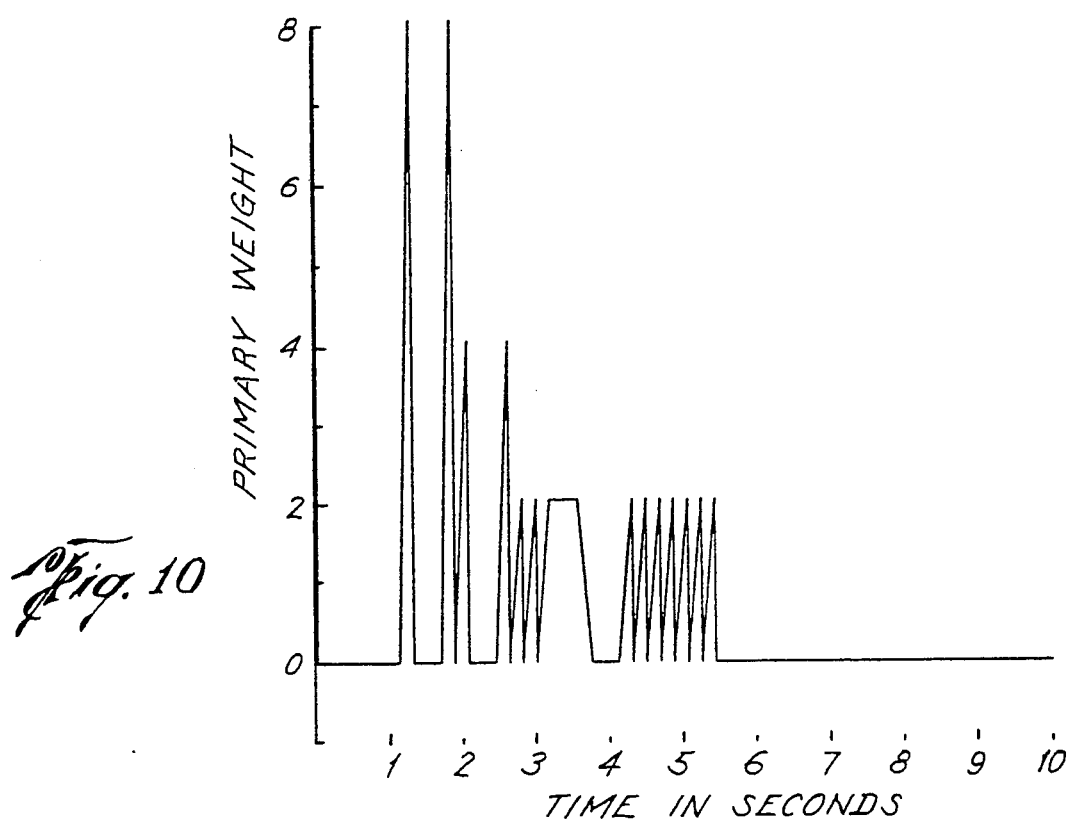
Figure 11:
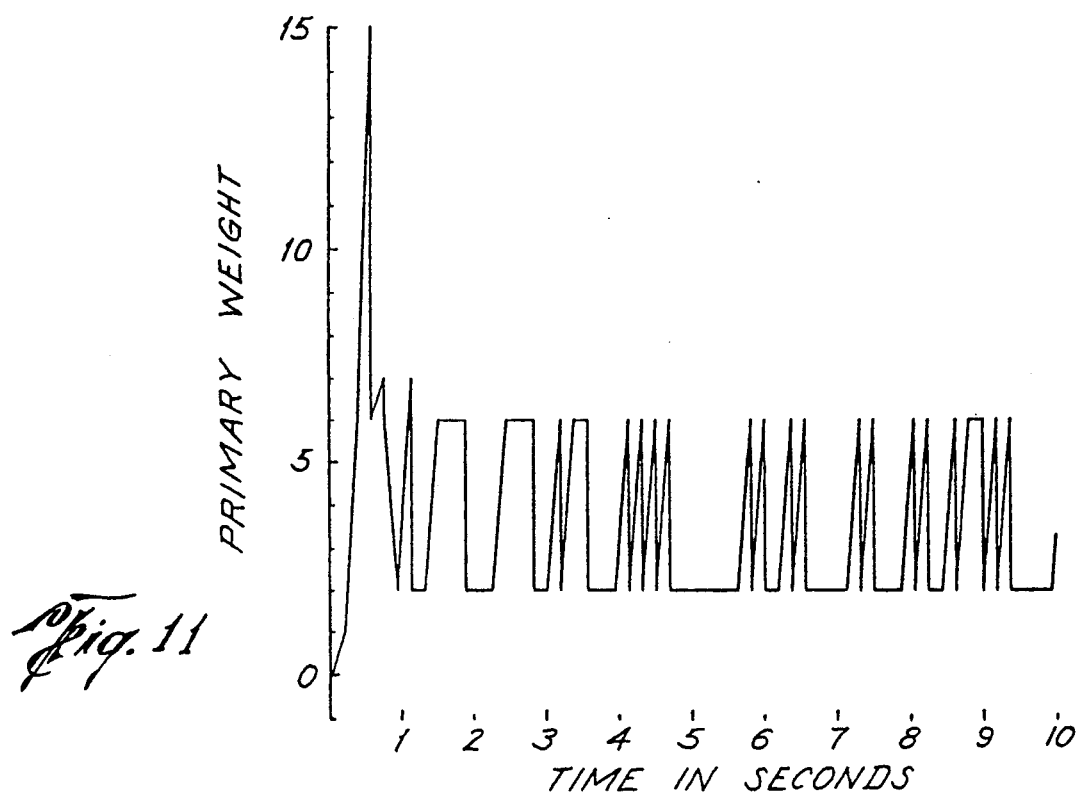

Referring now to FIG. 10, shown are the primary weights produced by motion sensor 101 in the upright position for the action of sitting down (seconds 0-3), and the action of being seated (seconds 3-10). FIG. 11 shows the primary weights produced by motion sensor 101 in the inverted position for the action of sitting down (seconds 0-1), and the action of being seated (seconds 1-10).

Figure 12:
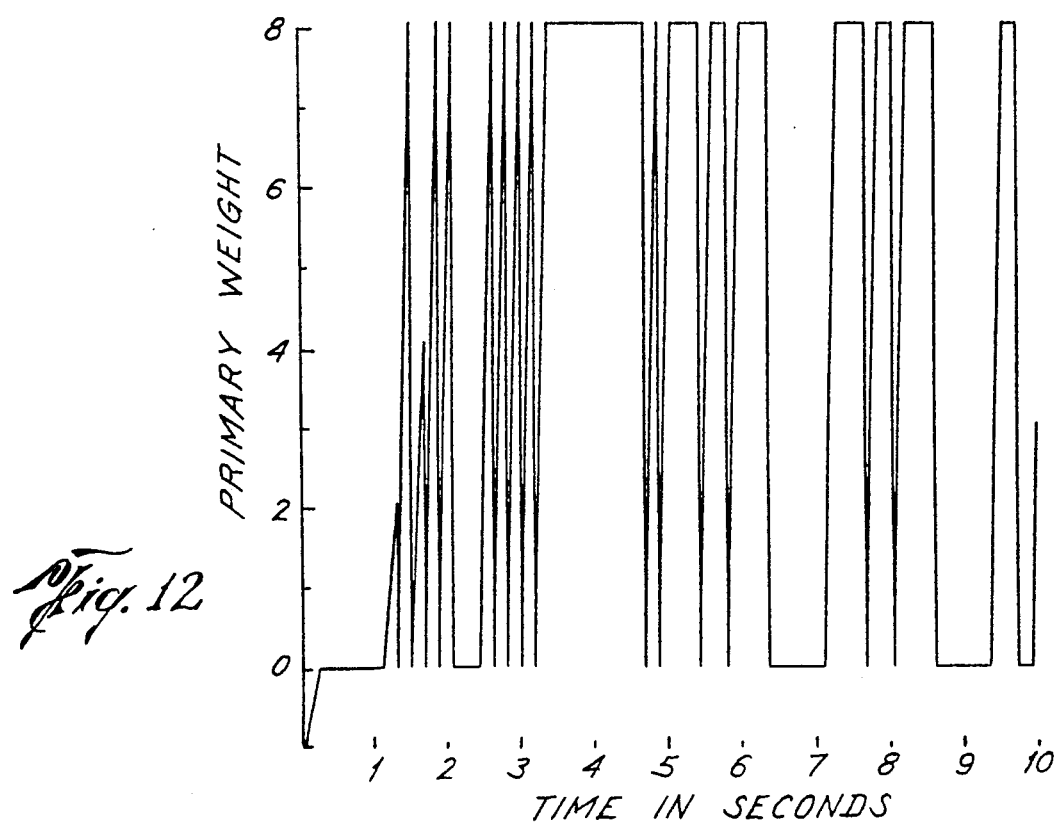
Figure 13:
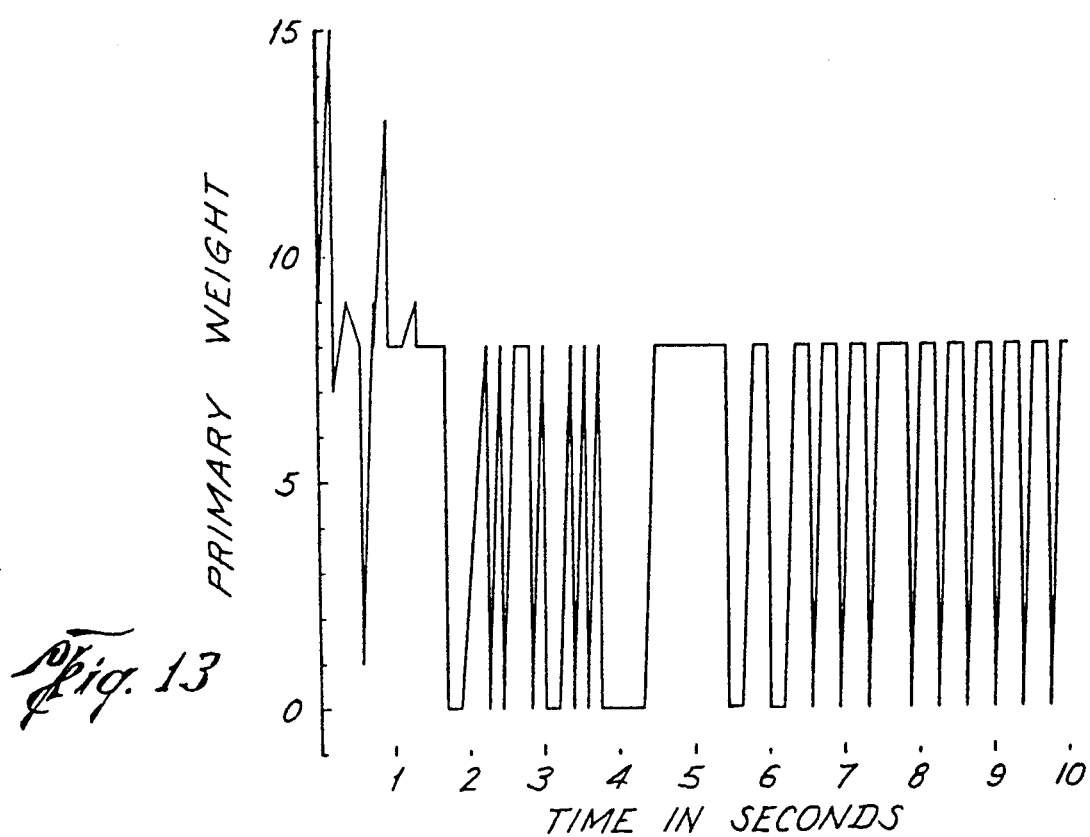

Finally, FIG. 12 plots the primary weights produced by motion sensor 101 in the upright position, with the wearer lying down for several seconds, and FIG. 13 presents the primary weights produced by motion sensor 101 in the inverted position with the wearer lying down for several seconds.

The seated and lying positions recorded in the graphs of FIGS. 10-13 simulate incapacity of a wearer of motion sensor 101. As can be seen with reference to FIGS. 10-13, both the seated and lying positions result in a rhythmic pattern of primary weights (believed to be indicative of breathing). In particular, seconds 3-10 of FIG. 10 reflect a rhythmic pattern of transition between primary weights 0 and 2, with no motion at all detected from approximately seconds 6-10. Seconds 1-10 of FIG. 11 reflects a rhythmic pattern of transition between primary weight 2 and primary weight 6. FIG. 12 reflects a rhythmic pattern of transition between primary weights 0 and 8, and FIG. 13 also reflects a rhythmic pattern of transition between primary weights 0 and 8.

It should be noted that the motion associated with normal activity (FIGS. 6-9) predictably results in a number of different primary weights occurring during a particular time period, regardless of the orientation of sensor 101, whereas the rhythmic nature of the primary weights, indicative of wearer incapacity (FIGS. 10-13), also predictably occurs, regardless of the orientation of motion sensor 101. Incapacity is indicated when less than three primary weights occur during a predetermined time period. It has also been observed that similar patterns of primary weights occur when sensor 101 is located with its axis substantially horizontal.

When applied as an angular position sensor, detectors 107-110, as mentioned above, preferably produce a substantially analog output signal, rather than the digital signal produced by detectors 107-110 when sensor 101 is applied as a motion sensor. In operation, detectors 107-110 are placed at a desired angle with respect to axis 131. Sensor 101 is then configured so that axis 131 is in a substantially vertical nominal position with light source 106 on top, and with detectors 107-110 below. Then, as sensor 101 tilts, the output signals produced by detectors 107-110 are analyzed to determine not only the degree of tilt of sensor 101, but also the direction of tilt relative to the nominal vertical position.

Although the present invention has been described with reference to a preferred embodiment, it will be understood by those of ordinary skill in this art that additions, deletions or changes can be made to this preferred embodiment, without departing from the spirit and scope of the present invention.

What is claimed is:

1. A sensor comprising:
   a chamber containing a substantially opaque ball, the chamber and ball being adapted to permit motion of the ball with the chamber substantially independent of an orientation of an axis of the chamber;
   a light source for emitting light into a first half of the chamber along the axis of the chamber; and
   a plurality of light detectors for detecting light exiting a second half of the chamber at respective angles relative to the axis of the chamber.

2. The sensor of claim 1, said light detectors comprising four in number.

3. The sensor of claim 1, said light source emitting infrared light.

4. The sensor of claim 1, said angles each being within the range of greater than 0° and less than 90° from the axis of the chamber.

5. The sensor of claim 4, said angles being substantially equal to one another.

6. The sensor of claim 5, said angles being approximately 45° from the axis of the chamber.

7. The sensor of claim 1, said opaque ball being substantially spherical.

8. The sensor of claim 1, said chamber being substantially spherical.

9. The sensor of claim 8, wherein said ball is substantially spherical.

10. The sensor of claim 9, wherein a ratio of a diameter of said chamber to a diameter of said ball is within the range of 2:1 to 5:1.

11. The sensor of claim 10, said ratio being approximately 2.6:1.

12. A sensor comprising:
    a first housing including a first chamber portion;
    a second housing including a second chamber portion;
    a substantially opaque ball;
    a means for connecting said first and second housings whereby said first and second chamber portions form a chamber containing said ball;
    a light source connected to said first housing for emitting light into said first chamber portion along an axis of the chamber; and
    a plurality of light detectors, connected to said second housing, for detecting light exiting said second chamber portion at respective angles relative to the axis of the chamber.

13. The sensor of claim 12, said means for connecting comprising:
    at least one flexible tang connected to one of said first and second housings; and
    at least one retainer formed in the other of said first and second housings, said at least one tang being retained by said at least one retainer when said first and second housings are connected to form said chamber.

14. The sensor of claim 12, said first and second housings being of material substantially transparent to a frequency of light produced by said light source.

15. The sensor of claim 12, further comprising:
    a sensor cover connected to said second housing, for retaining said plurality of light detectors adjacent said second housing.

16. A method of detecting an extent of motion comprising:
    projecting light into a first half of a chamber along an axis of the chamber;
    detecting light exiting a second half of the chamber at a plurality of angles relative to the axis to produce light detection signals; and
    analyzing said plurality of light detection signals to determine an extent of motion of the chamber.

17. A sensor comprising:
    a chamber containing a substantially opaque ball, the chamber and ball being adapted to permit motion of the ball within the chamber;
    a light source for emitting light into a first half of the chamber; and
    a plurality of light detectors for detecting light exiting a second half of the chamber at respective angles relative to an axis of the chamber.

* * * * *